(12) United States Patent
Smith

(10) Patent No.: US 6,665,150 B2
(45) Date of Patent: Dec. 16, 2003

(54) CONTAMINATION CONTROL ON ACTUATOR ARMS IN A DISK DRIVE

(75) Inventor: Gordon James Smith, Rochester, MN (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 10/037,008

(22) Filed: Nov. 9, 2001

(65) Prior Publication Data

US 2003/0090842 A1 May 15, 2003

(51) Int. Cl.[7] .................................................. G11B 5/55
(52) U.S. Cl. ................................. 360/265.7; 360/97.02
(58) Field of Search .......................... 365/265.7, 265.9, 365/266; 360/97.02

(56) References Cited

U.S. PATENT DOCUMENTS 5,801,905 A      9/1998   Schirle et al. ............... 360/104
6,310,749 B1  *  10/2001  Beatty ...................... 360/265.7

OTHER PUBLICATIONS

MICRO: Feb. 1998: Industry News: The Disk Drive Industry and Microcontamination; http://www.micromagazine.com/archive/98/02/breakout.html.
Edwin Dauber, "Optimising Contamination Control in Future Hard Disk Drives"; pp. 41–44.

* cited by examiner

Primary Examiner—A. J. Heinz
(74) Attorney, Agent, or Firm—James R. Nock; Ron Feece

(57) ABSTRACT

A hard disk drive actuator includes a plurality of arms for holding the heads over the disks. Each arm has one or more contaminant collectors for collecting contaminants, such as airborne particles, humidity, and/or organic gasses during operation. The contaminant collectors can take a variety of forms, including air porous filters mounted within existing cutouts within the plurality of arms. In this instance, the plurality of arms may be aerodynamically shaped to create a pressure differential between the top and bottom surfaces of the arms, causing an increased airflow through the filters. In another instance, the contaminant collector is a material applied to the top and bottom surfaces of the plurality of arms which attracts and/or captures airborne particles during normal operation.

29 Claims, 6 Drawing Sheets

CONTAMINATION CONTROL ON ACTUATOR ARMS IN A DISK DRIVE

FIELD OF THE INVENTION

The present invention relates generally to disk drive systems, and more specifically to an apparatus providing particulate filtration and contamination control in such systems.

BACKGROUND OF THE INVENTION

With the advent of magnetoresistive (MR) head technology and increasingly lower flying heights, microcontamination has emerged as one of the disk drive industry's major concerns. Microcontamination in disk drives can occur in a variety of forms, including particles, humidity, corrosive vapors, and organic gases. Sources of contaminants can be found both in internal components and the external environment where the drives or components are assembled or operated.

Concerns about humidity were initially centered upon its impact on stiction. More recently its facilitation and acceleration of corrosion have garnered the attention of disk drive manufacturers, for a number of reasons. Corrosion susceptibility has increased for the thinner magnetic and protective layers within the advanced MR and giant magnetoresistive (GMR) head designs. Smoother disks that are associated with near-contact recording have also increased sensitivity to humidity and organic contamination. Higher operating temperatures associated with higher RPM drives have increased the concentration levels of contaminants outgassing from the internal components.

Controlling particles is important for preventing head crashes and media corruption. Recent efforts have also focused on preventing thermal asperities. Reduction in flying heights, as well as the use of certain head designs and media composites has made controlling particles even more crucial. Any inclusion of contaminants such as dust or other particles may cause damage to the disk surfaces if trapped between the disk surfaces and the slider, which is aerodynamically supported at a minute distance above the disk surface. Any solid contaminants trapped between the slider and this disk surface may score, scratch or damage the disk recording surface, destroying the ability of the disk to record or retrieve data reliably at that location (e.g., thermal erasure), and can lead to a head crash. While efforts to eliminate particles within the disk drive are made during assembly, aging and use of the disk drive typically will result in subsequent deterioration of some components and additional contaminant particles being present in the disk drive.

In order to address the contaminant problem in disk drives, particle and adsorption filters have been developed in order to capture and control contaminants. Carbon adsorption filters are commonly employed to reduce hydrocarbons, and other contaminants like acrylic acid and sebacate. Activated carbon and silica gels are used for humidity control.

The two main types of particle filtration devices typically employed within disk drives are breather filters and recirculation filters. To enable the breather filter to be effective in filtering the air coming into the drive, it needs to be the lowest pressure drop path into the drive. In other words, the air must go through the breather filter instead of bypassing it and entering the drive through another unfiltered leak path. Thus, one needs either a drive that has good seals and a very low leakage rate or a low pressure-drop breather filter. Since it typically costs more to seal a drive well, a breather filter with a lower pressure drop is the usual choice. This is particularly important when using adsorbent breather filters, which can have pressure drops that are higher than ambient particle breather filters.

Recirculation filters remove particulates from the air as the spinning disks rotate the air and therefore particles inside the drive. Particle capturing efficiency, resistance to airflow (i.e., air not flowing through the filter remains unfiltered), and filter locations are important in cleaning the air. Resistance to airflow can be affected by the media, but also by the size of the filter or the number of filters used.

Recent high-RPM disk drives use shrouding almost completely around the disk pack in order to reduce power consumption and to reduce disk flutter. Unfortunately, drives with near fully shrouded disk packs typically do not allow for convenient placement of a recirculating type filter (e.g., in a corner of a base casting). Instead, the filters currently employed within shrouded disk packs are complex, bulky devices which are not very effective, since they are not in the optimal recirculation path. As a result, particles generated by the head-disk interface, particularly for disks within the disk pack, are not easily intercepted by the poorly located recirculation filters. In fact, the movement of the air within the disk pack will entrain and circulate the contaminant particles and significantly raise the probability of disk damage. Finally, these filtering approaches consume significant space and increase the complexity of the disk drives, thus preventing or defeating extensive efforts to reduce power consumption of the drive motors.

As a result, there is a need within the disk drive industry for more effective contaminant control in low flying height disk drives, especially in high RPM drives which employ shrouding to reduce power consumption and reduce disk flutter.

SUMMARY OF THE INVENTION

The present invention provides an apparatus for particulate filtration and contamination control in a disk drive system. The present invention accomplishes this goal by providing one or more contaminant collectors attached to the actuator arms in a disk drive. During drive operation, the contaminant collectors capture airborne particles and other contaminants that can potentially damage and interfere with the normal operation of the disk drive.

More specifically, the present invention provides an actuator assembly for supporting a magnetic head in a disk drive. The actuator assembly includes an actuator body having at least one actuator arm connected thereto. Each actuator arm includes at least one contaminant collector operably attached to the arm.

In one embodiment, each actuator arm has one or more cutouts extending through the arm into which a contaminant collector is mounted. In one embodiment, the contaminant collector is made of a porous material, allowing the passage of air through the collector, while trapping airborne contaminant particles. In an exemplary embodiment, the actuator arms are aerodynamically shaped to create a pressure differential between the top and bottom surfaces of the collector during operation, resulting in increased airflow though the collector.

In one embodiment, the contaminant collector is made of a thin, porous planar plastic film, having the capability of capturing airborne particles having a diameter greater than approximately 0.025 micron. In alternative embodiments, the porous contaminant collector is made of an expanded polyvinyl chloride (PVC) plastic, a micro porous polymer of cellulose ester formed around a polyester web, an electret material, or a fibrous material, such as wool or plastic. In another embodiment, the contaminant collector is made of a conductive material that is actively maintained at a predetermined electric potential by a voltage source. The contaminant collector may also be made of an adsorbent material, such as carbon impregnated plastic. Finally, the contaminant collector may incorporate the combination of two or more of the contamination control elements described above.

In yet another embodiment, the contaminant collector is applied to the surfaces of the actuator arm. In this instance, the collector may operate in conjunction with the embodiment of the contaminant collector described above (i.e., the porous filter mounted in the arm cutouts), or may employed alone. In this embodiment, the collector traps particles that come in contact with it. In an exemplary embodiment, this contaminant collector is an inert oil. In alternative embodiments, the contaminant collector is an electret material, or a sticky, non-outgassing adhesive.

In another aspect, a hard disk drive includes a plurality of magnetic storage disks disposed coaxially with respect to each other. An actuator body is positioned adjacent to the disks and is movable relative thereto in response to a control signal. Also, a plurality of transducers are juxtaposed with the storage disks for data transfer therebetween. One or more actuator arms are connected to the actuator body, with each actuator arm including a head-suspension assembly end for holding one or more transducers. Per the present invention, the actuator arms further include at least one contaminant collector operably attached to the at least one actuator arm.

In still another aspect, a digital processing apparatus includes a computer, a plurality of magnetic storage disks disposed in the computer coaxially with respect to each other, and an actuator body positioned adjacent the disk and movable relative thereto in response to a control signal. Also, the apparatus includes a plurality of transducers that are juxtaposed with the storage disks for data transfer between the disks and the computer. Furthermore, the apparatus includes a plurality of actuator arms that are connected to the actuator body, with each actuator arm including a head suspension assembly end distanced from the body for holding one or more transducers. Per the present invention, the actuator arms further include at least one contaminant collector operably attached to the at least one actuator arm.

The details of the present invention, both as to its structure and operation, can best be understood in reference to the accompanying drawings, in which like reference numerals refer to like parts.

DETAILED DESCRIPTION OF THE PREFERRED EMBODIMENTS

Figure 1A:
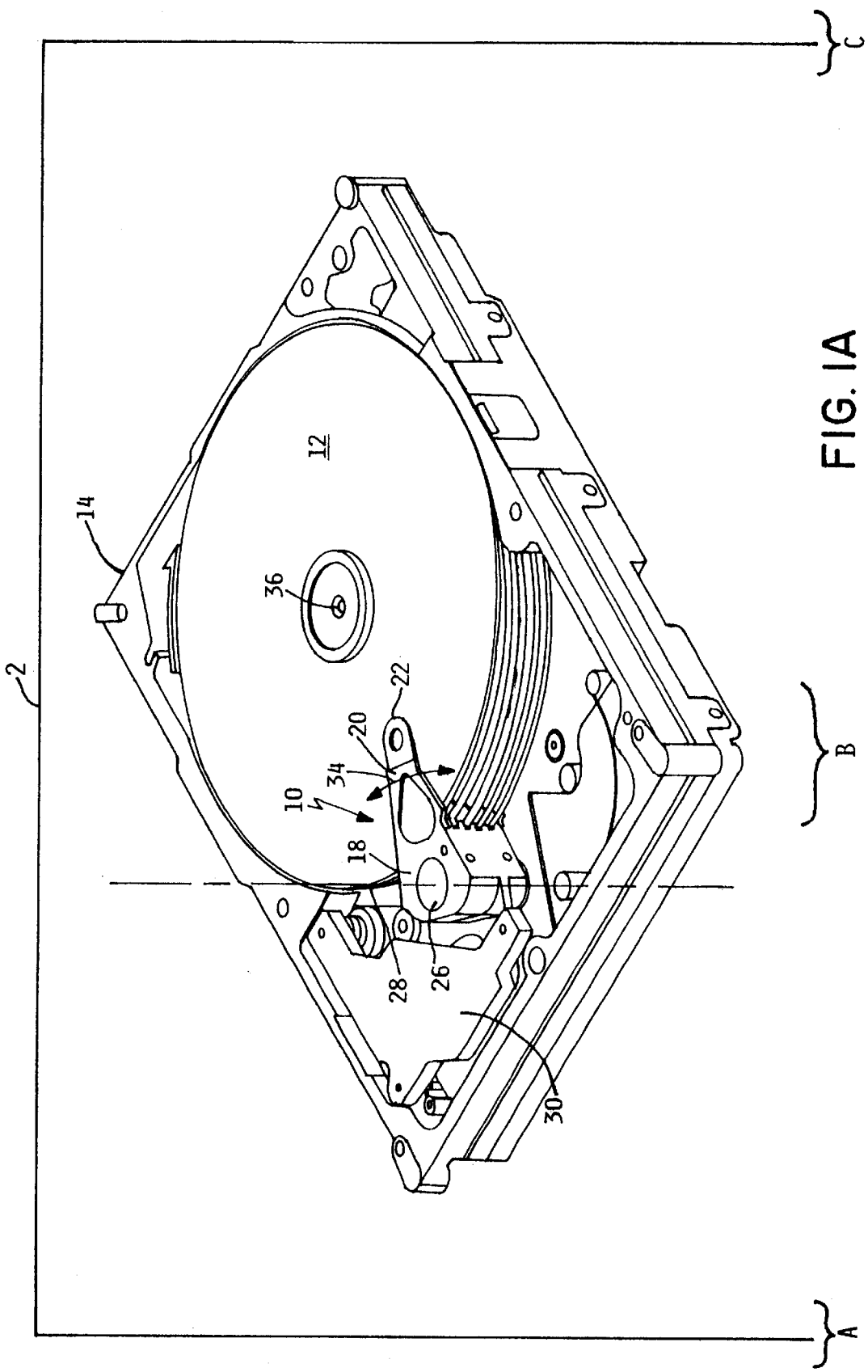
FIGS. 1A and 1B collectively represent a partially schematic view of the actuator assembly in operable engagement with a hard disk drive in a computer, with portions removed for clarity.
Figure 1B:
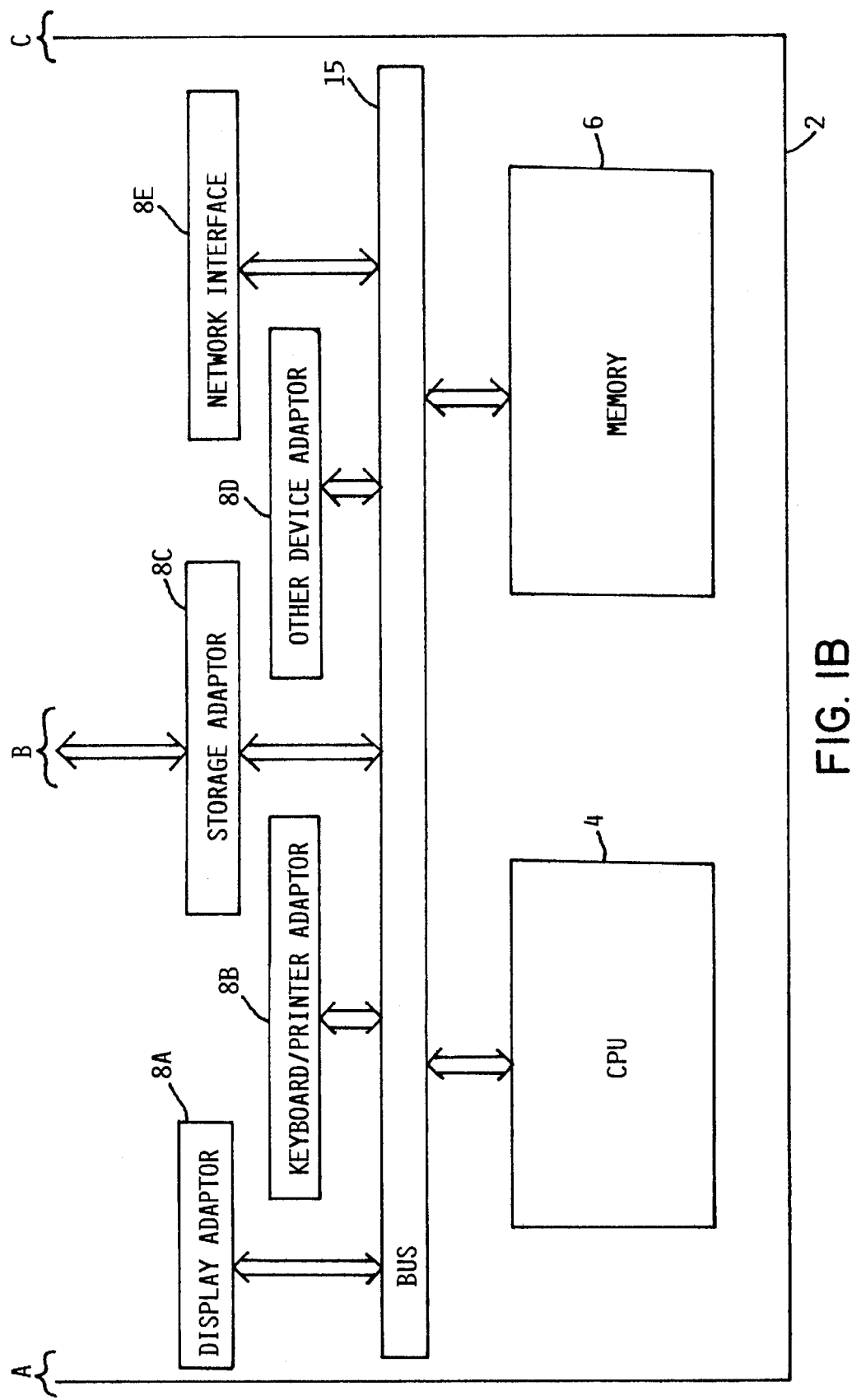

Turning to the Drawings, wherein like numbers denote like parts throughout the several views, FIGS. 1A and 1B collectively illustrate a computer system, generally designated at 2. Computer system 2 includes a Central Processing Unit (CPU) 4, main memory 6, various adapters and interfaces 8A–8E, a hard disk drive 14, and a communications bus 15. Hard disk drive 14 communicates with computer 2 via storage adapter 8C and communications bus 15. Hard disk drive 14 includes an actuator assembly 10, which is operably engaged with hard disk drive 14 and computer system 2.

As shown in FIG. 1A, the actuator assembly 10 includes an actuator body 18 and a plurality of actuator arms 20 extending outwardly away from the actuator body 18, with each actuator arm 20 including a respective head-suspension end 22 that supports a head-suspension and data transducer heads (not shown) in accordance with means well-known in the art. Preferably, the actuator body 18 is unitarily made with the actuator arms 20 from a lightweight yet stiff metal such as aluminum or magnesium.

As further shown in FIG. 1A, the body 18 of the actuator assembly 10 includes a bearing assembly 26 which is rotatably mounted on the hard drive 14 for rotation about an axis 28. To rotate the actuator assembly 10, a mover, such as a voice coil motor (VCM) 30, is operably engaged with the actuator assembly 10. In one presently preferred embodiment, the VCM 30 is part of a so-called "Whitney" or rotary actuator drive assembly that rotates the actuator assembly 10 in response to a control signal from a drive controller (not shown).

FIG. 1A shows, for clarity, only five disks 12 and six actuator arms 20, with each actuator arm 20 being closely juxtaposed with a respective disk 12 and with a disk 12 separating adjacent actuators arms 20. It is to be understood, however, that more or fewer disks 12 and actuator arms 20 can be used in accordance with principles disclosed herein, and that as disclosed below the assembly 10 can include six (6) actuator arms 20. In any event, the disks 12 are coaxially aligned with each other, i.e., the disks 12 are stacked. Likewise, the actuator arms 20 are stacked relative to each other.

In accordance with principles well-known in the art, the actuator assembly 10 can be rotated to move the actuator arms 20 with heads (not shown) radially inwardly and outwardly relative to the disks 12, in the directions indicated by the double arrow 34. Accordingly, as the disks 12 are rotated by a spindle motor 36, the heads are positioned over data tracks on the disks 12 for data transfer between the heads and data tracks.

Figure 2:
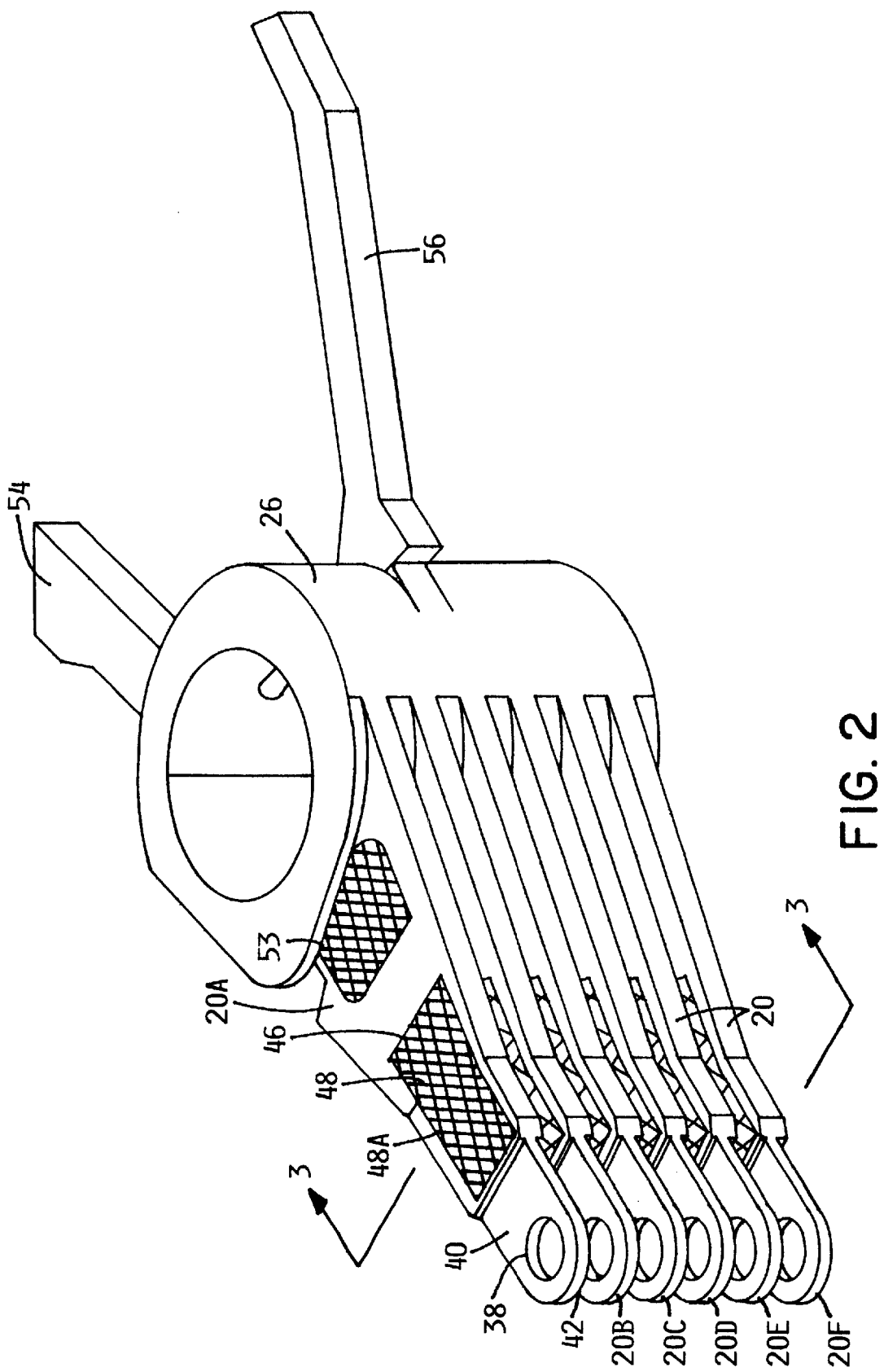
FIG. 2 is a perspective view of the actuator assembly, with the head-suspension assemblies removed for clarity.

Turning now to FIG. 2, a preferred embodiment of the actuator assembly 10 can be seen which incorporates six (6) actuator arms 20A–20F. It is to be understood that the actuator arms 20 are substantially identical to each other in construction and configuration.

FIG. 2 shows that the actuator arm 20A is formed with a respective head suspension assembly hole 38 from a top surface 40 of the actuator arm 20A to a bottom surface 42 of the actuator arm 20A. As intended by the present invention, a head-suspension assembly (not shown) is engaged with the head-suspension assembly hole 38, and a head is attached to a flexure, which is attached to the head suspension assembly. One or more heads can be attached to a single actuator arm 20A, if required.

Figure 3:
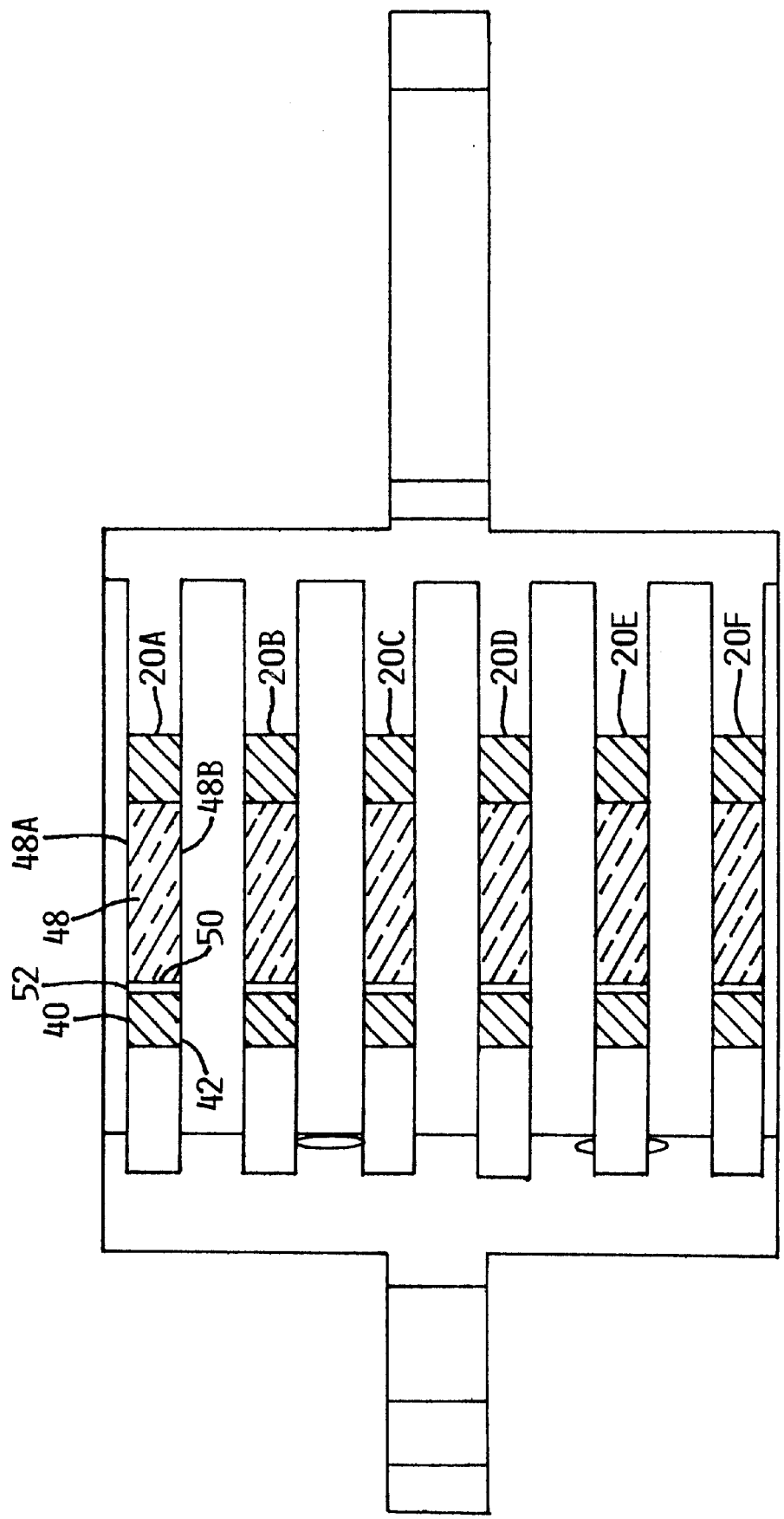
FIG. 3 is a cross-sectional view, as seen along the line 3—3 in FIG. 2.

Additionally, between the head-suspension assembly hole 38 and the bearing assembly 26, the actuator arm 20A is formed with a first generally parallelpiped-shape opening, referred to herein as a first "cutout" 46, which extends from the top surface 40 to the bottom surface 42. In the illustrated embodiment, a contaminant collector insert 48 is disposed in the first cutout 46, with the insert 48 substantially filling the cutout 46. Also, referring briefly to FIG. 3, top and bottom surface 48a and 48b, respectively, of the insert are flush with the top and bottom surfaces 40 and 42, respectively, of the actuator arm 20A.

FIG. 2 also shows that the actuator arm 20A can be formed with a second cutout 53, between the first cutout 46 and the bearing assembly 26. Like the first cutout 46, the second cutout 53 is filled with a contaminant collector insert 48 that is shared substantially identically to the second cutout.

Two legs 54, 56 extend outwardly away from the bearing assembly 26 generally opposite to the actuator arms 20. As shown, the legs 54, 56 essentially establish two sides of a triangle, and in accordance with means well-known in the art, the coil (FIG. 1, element 30) is attached to the legs 54, 56.

Contamination collector insert 48 is designed to capture the contaminants as they either pass through the insert (i.e., the insert is made of a maze-like porous material), and/or capture the contaminants as they contact a tacky surface of the insert. By placing insert 48 on or within each arm assembly 20A–20F, a large available surface area is available for contaminant capture. The surfaces of the insert 48 can be roughened to increase turbulence and therefore the likelihood that particles will be trapped. Particles can also be trapped on the surface of the insert by Van der Waals attraction.

Contamination collector insert 48 can be made from a variety of lightweight materials. In one embodiment, insert 48 is made from an air porous plastic film, having a thickness of approximately 0.01 to 0.1 mm. Such a material allows the capture of particles having a diameter of approximately 0.025 micron or larger. An example of a material is MF-Millipore™ Membrane filters consisting of biologically inert mixtures of cellulose acetate and cellulose nitrate material available from Millipore, Inc.

In another embodiment, insert 48 is made of an expanded polyvinyl chloride (i.e., PVC) plastic, which is supported by a rigid frame that fits cutouts 46, 53. Other materials that are suitable for membrane filters are aluminum oxide and polycarbonate plastic. For these materials, foreign particulate contaminants are trapped at or near the surface of the filter.

In another embodiment, contamination collector insert 48 is made of a micro porous polymer of cellulose ester formed around a polyester web. These filters retain contamination on the cellulose membrane and are highly retentive non-fiber releasing membrane filters. An example of an appropriate material is RW-Pre filter available from Millipore, Inc.

In another embodiment, contamination collector insert 48 is made of a porous, weave lint-free material structure supported by a rigid foam and cross members for support. Three types of weave filters are commonly employed. These types are twill weaves, plain Dutch weaves and twill Dutch weaves. In a twill weave, each weft wire (i.e., the wires running widthwise during weaving) passes successively over two and under two warp wires (i.e., the wires running lengthwise during weaving), and each warp wire passes successively over and under two weft wires. Plain Dutch weaves can accommodate high flow rates with a relatively low pressure drop. They are woven with each warp and weft passing over and under one wire. The weft wires are generally smaller in diameter than the warp wires and are driven up close together, creating a dense weave. Twill Dutch weaves allow an even higher particle retention than plain Dutch weaves. The term "twill" indicates the warp and weft wires pass alternately over two and under two wires. The term "Dutch" refers to the use of a heavier warp wire diameter in conjunction with a lighter weft wire diameter. In a twill Dutch double weave, the weft wires are driven up so tightly that there is always a weft wire above and below the warp wires, creating a weave with the warp wires completely covered. The flow-pass geometry is extremely tortuous, insuring excellent particle size retention.

In yet another embodiment, contamination collector insert 48 is made of non-porous hard plastic having an adhesive material applied to the top and bottom surfaces. In accordance with the present invention, insert 48 is made of a material that is lighter weight (i.e., that is less dense) then the actuator arm 20. As an example, insert can be made of a polymer such as Ultem® made by General Electric plastics. The plastic insert 48 is then coated with a sticky, non-outgassing adhesive material, (e.g., an inert oil). As contaminant particles come into contact with the adhesive material, they are captured and retained. It is contemplated that an adhesive material can be applied to additional surfaces of the actuator. In fact, the adhesive material can be applied to the entire actuator comb assembly.

In another embodiment, contamination collector insert 48 is made of an adsorbent material. Adsorbent materials serve the purpose of adsorbing unwanted vapors in the disk drive (e.g., chemicals outgassed from subassemblies within the disk drive). Also, adsorbent materials can also act as a desiccant, adsorbing moisture present inside the drive assembly. Examples of adsorbent materials include, but are not limited to: activated carbon, carbon impregnated plastic, calcium chloride and silica gel.

In yet another embodiment, contamination collector insert 48 is made of an electret material that can store a charge and attract and retain particles. An electret material is an electrically insulating, or dielectric, material that has acquired a long-lasting electrostatic polarization. Electrets are produced by heating certain dielectric materials to a high temperature and then letting them cool while immersed in a strong electric field. An electret is an analog of a permanent magnet. This electret material can exist at the surfaces of a non-porous insert 48, or may be imbedded within an air porous insert. It is contemplated that a wide variety of additional materials and configurations may be employed for the construction of contamination collector insert 48, and still remain within the scope and spirit of the present invention.

Finally, in another embodiment, contamination collector insert 48 is made of an electrically conductive material such as conductive plastic, or a plastic covered with an electrically conductive film. In this embodiment, contamination collector insert is deliberately maintained at a predetermined electric potential to attract contaminant particles. This potential can be supplied by a DC power supply attached to or built into the disk drive 14. Contamination collector insert 48 can be either non-porous (i.e., a solid plastic insert) or may be incorporated within an air porous structure. In fact, this active, electrically coupled insert may be combined with other contaminant control features previously described. As an illustrative example, a contamination collector insert 48 can be constructed of porous, weave lint-free material, where the material includes conductive plastic threads. In this instance, contaminants are not only captured by the tortuous path through the weave, but also by the attractive forces present within the actively powered, electrically charged threads.

Figure 4:
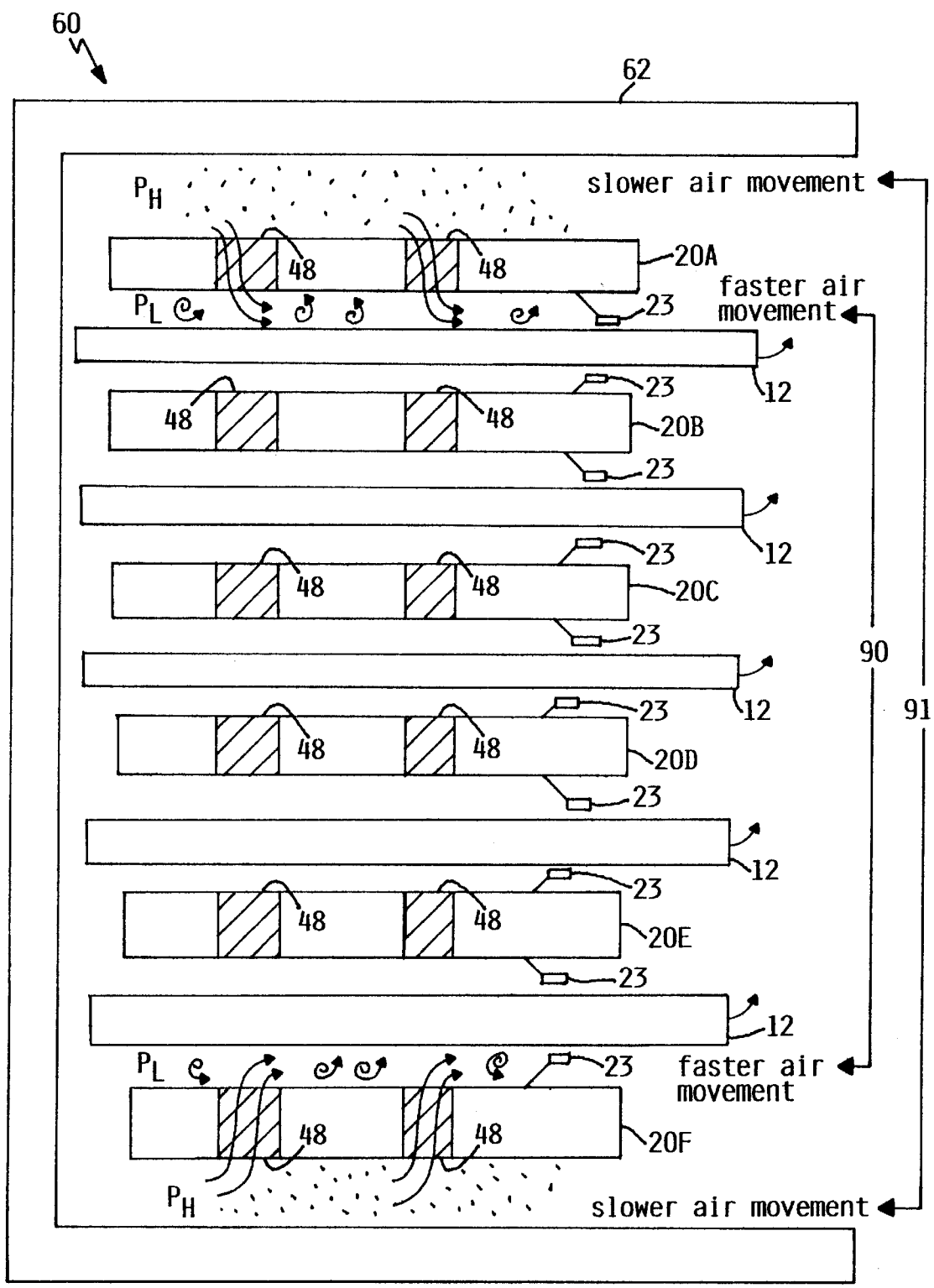
FIG. 4 illustrates a cross sectional side view of an actuator assembly in accordance with the present invention, where the actuator assembly is positioned within a disk shroud.

Turning now to FIG. 4, a cross sectional view of an actuator assembly positioned within a disk shroud 62 is illustrated generally at 60. Assembly 60 includes a plurality of disks 12. Interspersed between the disks 12 are a plurality of actuator arms 20A–20F, each actuator arm having at least one head 23 suspended near a surface of the disk 12.

If an air porous material is employed within contamination collector insert 48, air will flow through the insert if a pressure differential exists between the top and bottom surfaces of the insert. Arms 20A, 20F that support the outer heads (i.e., the top and bottom heads) will have a moving disk surface on one side of the insert 48 (the disk side 90) and relatively still air around the shroud 62 (the shroud side 91). The higher velocity air on the disk side 90 will create a pressure that is less than the pressure on the shroud side 91 (i.e., Bernoulli's law). As a result, air will flow through the insert 48 from the shroud side 91 to the disk side 90, and contaminants will be captured in the maze like structure of the insert 48. Experimental results indicate that a pressure differential of up to one inch of water can be produced by such an arrangement.

Bernoulli's equation states that the sum of pressure and density times velocity squared is constant. Bernoulli's equation is shown below:

$$P + \frac{1}{2}\rho v^2 = \text{constant} \qquad \text{EQUATION 1}$$

where P is pressure, $\rho$ is fluid density, and v is the fluid velocity. This equation can be rewritten as:

$$P = \text{constant} - \frac{1}{2}\rho v^2 \qquad \text{EQUATION 2}$$

By EQUATION 2, as velocity increases, pressure decreases. According to the principle of equal transit times, air passage over an upper wing surface must occur in the same time as air passage below. In order to have the same transit time, flow at a more curved upper wing surface, having a longer path, is said to be of greater velocity than that at a less curved lower surface, making upper surface pressure less than that at the lower.

Figure 5:
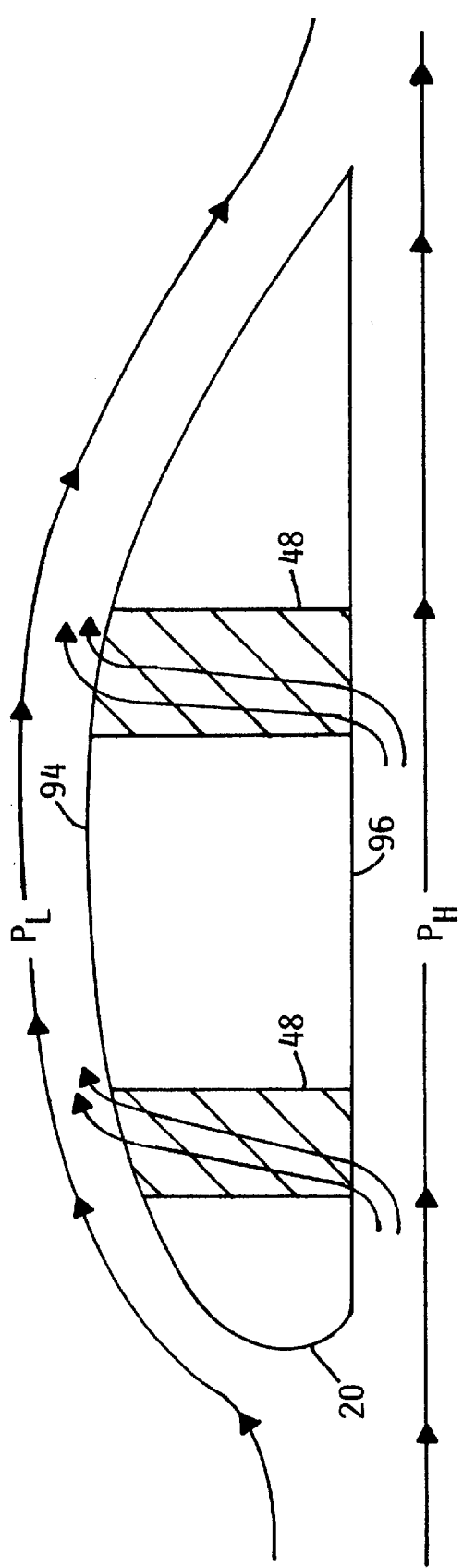
FIG. 5 is a cross sectional side view of an actuator arm in accordance with the present invention, where the arm has an aerodynamic "wing" shape.

FIG. 5 is a side perspective view of an actuator arm, where the arm has an aerodynamic "wing" shape. If actuator arm 20 is aerodynamically shaped like a "wing", the air along the upper surface 94 of the arm 20 (i.e., the more curved surface of the wing) will have a relatively greater velocity than the air along the lower surface 96 of the arm 20 (i.e., the less curved lower surface of the wing). As a result, a surface pressure differential will exist between the upper 94 and lower 96 surfaces of the arm 20 during normal operation, causing air to flow from the high pressure surface (the relatively flat, lower surface 96) to the lower pressure surface (the curved upper surface 94) through insert 48. In this way, air can be directed to flow through the contamination collector insert 48 present in all arms 20A–20F of the actuator assembly, not just the arms 20A, 20F which support the outer heads, as previously shown in FIG. 4.

Additional modifications may be made to the illustrated embodiments without departing from the spirit or scope of the invention. Therefore, the invention lies in the claims hereinafter appended.

What is claimed is:

1. An actuator assembly for supporting a magnetic head in a disk drive assembly, comprising:
   an actuator body;
   at least one actuator arm connected to the actuator body;
   at least one contaminant collector operably attached to the at least one actuator arm wherein the contaminant collector is made of a conductive material, wherein the conductive material is maintained at a predetermined electric potential by a DC power supply.

2. The actuator assembly of claim 1, wherein the conductive material is a conductive plastic.

3. The actuator assembly of claim 1, wherein the conductive material is a plastic having an electrically conductive film disposed thereon.

4. An actuator assembly for supporting a magnetic head in a disk drive assembly, comprising:
   an actuator body;
   at least one actuator arm having, connected with the actuator body and having a cutout extending there through; and
   a contaminant collector, mounted within the cutout and made of a porous material that allows the flow of air there through.

5. The actuator assembly of claim 4, wherein the at least one actuator arm is aerodynamically shaped to create a pressure differential between the top surface and the bottom surface during operation, causing an increased airflow through the contaminant collector.

6. The actuator assembly of claim 5, wherein the at least one contaminant collector captures particles carried by airflow through the collector.

7. The actuator assembly of claim 6, wherein the at least one contaminant collector is made of a thin, planar plastic film.

8. The actuator assembly of claim 7, wherein the thin, planar plastic film is approximately 0.01 mm to 0.1 mm in thickness.

9. The actuator assembly of claim 7, wherein the thin, planar plastic film is capable of trapping particles having a diameter of greater than approximately 0.025 micron.

10. The actuator assembly of claim 6, wherein the at least one contaminant collector is made of an electret material.

11. The actuator assembly of claim 6, wherein the at least one contaminant collector is made of a fibrous material having uniform thickness.

12. The actuator assembly of claim 11, wherein the fibrous material is a plastic fiber.

13. The actuator assembly of claim 6, wherein the at least one contaminant collector is made from an expanded polyvinyl chloride (PVC) plastic.

14. The actuator assembly of claim 6, wherein the at least one contaminant collector is made of a micro porous polymer of cellulose ester formed abound a polyester web.

15. The actuator assembly of claim 4, wherein the at least one contaminant collector is an adsorption filter.

16. The actuator assembly of claim 15, wherein the at least one contaminant collector is a desiccant.

17. The actuator assembly of claim 16, wherein the desiccant is silica gel.

18. The actuator assembly of claim 15, wherein the adsorption filter is made of carbon impregnated plastic.

19. A disk drive, comprising:
   at least one storage disk;
   an actuator body positioned adjacent the at least one storage disk and movable relative thereto;

a motor coupled to the actuator body for moving the actuator body in response to a control signal;

at least one transducer disposed for data transfer with the at least one storage disk;

at least one actuator arm connected to the actuator body, the at least one actuator arm including an end distanced from the actuator body for holding the at least one transducer, the at least one actuator arm having a top and a bottom surface and a cutout extending there through; and at least one contaminant collector operably attached to the at least one actuator arm, and extending through the cutout, wherein the at least one contaminant collector is made of a porous material, allowing the flow of air there through.

20. The disk drive of claim 19, wherein the at least one contaminant collector captures particles carried by airflow through the collector.

21. An actuator assembly for supporting a magnetic head in a disk drive assembly, comprising:

an actuator body;

at least one actuator arm connected to the actuator body;

at least one contaminant collector operably attached to the at least one actuator arm, wherein the contaminant collector is an electret material.

22. An actuator assembly for supporting a magnetic head in a disk drive assembly, comprising:

an actuator body;

at least one actuator arm connected to the actuator body;

at least one contaminant collector operably attached to the at least one actuator arm wherein the contaminant collector is a stick, non-outgassing adhesive.

23. An actuator assembly for supporting a magnetic head in a disk drive assembly, comprising:

an actuator body;

at least one actuator arm connected to the actuator body;

at least one contaminant collector operably attached to the at least one actuator arm, wherein the collector is an inert oil.

24. A digital processing apparatus, comprising:

a computer;

at least one storage disk disposed in the computer;

an actuator body positioned in the computer adjacent the at least one storage disk and moveable relative thereto;

a motor displayed in the computer and coupled to the actuator body for moving the actuator body in response to a control signal;

at least one transducer disposed in the computer for data transfer with the at least one storage disk;

at least one actuator arm in the computer and connected to the actuator body, the at least one actuator arm including an end distanced from the actuator body for holding the at least one transducer, the at least one actuator arm including a top surface and a bottom surface; and a contaminant collector operably attached to the at least one actuator arm.

25. The digital processing apparatus of claim 24, wherein the actuator arm includes at least one cutout extending therethrough.

26. The digital processing apparatus of claim 25, wherein the at least one contaminant collector is mounted within the at least one cutout.

27. The digital processing apparatus of claim 26, wherein the at least one contaminant collector is made of a porous material, allowing the flow of air therethrough.

28. The digital processing apparatus of claim 27, wherein the at least one contaminant collector captures particles carried by airflow through the collector.

29. The disk drive of claim 24, wherein the contaminant collector has properties for collecting airborne contaminant particles, and the contaminant collector is applied to at least a portion of the top surface and the bottom surface of the at least one actuator arm.

* * * * *